United States Patent [19]

Lawton

[11] 4,151,327

[45] Apr. 24, 1979

[54] COMPLEX AMINE/SILANE TREATED CELLULOSIC MATERIALS

[76] Inventor: William R. Lawton, 6651 Jewitt-Holmwood Rd., Orchard Park, Erie County, N.Y. 14127

[21] Appl. No.: 880,773

[22] Filed: Feb. 24, 1978

[51] Int. Cl.² .......................... B05D 3/02; B32B 9/04

[52] U.S. Cl. .......................... 428/447; 106/2; 106/13; 106/287.11; 106/287.2; 106/287.3; 106/227; 427/342; 427/390 E; 427/391; 427/392; 427/393; 427/394; 427/395; 427/396; 427/397; 428/452

[58] Field of Search .............. 427/324, 325, 326, 391, 427/392, 393, 390 E, 248 R, 254, 340, 342, 387; 106/287.11, 287.2, 287.3, 287.31, 2, 13; 8/106 R; 428/447, 452

[56] References Cited

U.S. PATENT DOCUMENTS

| | | | |
|---|---|---|---|
| 2,782,090 | 2/1957 | Robbart | 8/116 R |
| 2,995,470 | 8/1961 | Robbart | 427/248 R |
| 3,318,757 | 5/1967 | Atwell | 427/387 X |
| 3,558,345 | 1/1971 | Baum et al. | 427/387 X |
| 3,966,531 | 6/1976 | Bargain | 427/387 X |

*Primary Examiner*—Michael R. Lusigman
*Attorney, Agent, or Firm*—Kegan, Kegan & Berkman

[57] ABSTRACT

Paper, cotton cloth, wood, fiberboard, and other cellulosic products are first treated with an organic base and then treated with a halosilane. This results in the formation of an amine/silane complex within the cellulose fibers as well as on the surface of the cellulosic product. This treatment imparts oil and water repellency, adhesive properties, and dimensional stability to cellulosic products.

10 Claims, No Drawings

COMPLEX AMINE/SILANE TREATED CELLULOSIC MATERIALS

BACKGROUND OF THE INVENTION

This invention relates to the novel treatment of cellulosic products such as paper, cloth, wood, and fiberboard to render them oil and/or water repellent, dimensionally stable to moisture, to make them transparent or opaque, and to provide good release properties. Many methods have been described for rendering cellulosic materials water repellent. Fluorocarbons have been used to impart oil and water resistance. Chromium complexes of fatty acids such as Quilon ® manufactured by E. I. DuPont and similar products manufactured by the 3M Co. and others have also been used to impart water resistance. Polymeric silicones have been used to provide release properties as well as water and oil resistance. Such treatments are generally expensive and often impart undesirable properties to the product. Most of the above treatments require a heating step or other additional processing to cure or age the coating and make the treated product more functional. The products of the present invention can be produced economically, can be tailored to produce a desired performance or property, and do not require after-treatment or aging.

PRIOR ART

Silane treatment of paper and other cellulosic materials is known in the art. Robbart, U.S. Pat. Nos. 3,856,558; 2,995,470; 2,961,338; 2,824,778; and 2,782,090 describe a method of rendering cellulosic materials such as paper and cloth water repellent by first contacting the cellulose materials briefly with halosilane vapors usually followed by passing through an oven at elevated temperature with high air velocity to remove the acid by-products formed. The moisture content is critical, since water must be present to produce the initial reaction. But water also has a deteriorating effect at higher concentrations. Norton, U.S. Pat. No. 2,412,470 and Patnode, U.S. Pat. No. 2,306,222 describe the treatment of cellulosic materials with chlorosilane vapors. In both processes, a second step involving treatment with aqueous alkali or vapors from ammonia and amines is necessary to remove or neutralize the hydrochloric acid formed as a by-product.

In all of the above cases, only a very small amount, essentially immeasurable by ordinary techniques, of the product of the halosilane treatment remained in the cellulosic material. The moisture content of the cellulosic material must be carefully controlled. If the moisture content is too low, a satisfactory reaction does not occur. If the moisture content is too high, excess halogen acids are formed as by-products which deteriorate the cellulosic materials and make them useless. Norton, U.S. Pat. No. 2,386,259 describes an attempt to minimize such deterioration. He first hydrolyzes the silanes with water and washes away the halogen acids from the oily hydrolysis product. This material is then dissolved in a solvent and used to impregnate the cellulosic material which is then dried and, normally, heated to improve water repellency. A catalyst such as a lead, zinc, or iron resinate, or a borate can be used to accelerate the aging reaction at room temperature.

There is considerable prior art in the use of amines to swell the fibers in cellulosic products. Ethylene diamine has been used to swell rayon fiber, Lokhande et al., Textile Res. J. 46(12), 897–8(1976), Gortsema, French Pat. No. 2,047,687, cotton fabrics, Bredereck et al., Melliand Textilber. Int. 54 (3, 263–9(1973), sulfite pulp, Kaimins et al., and cellulose fibers, Holtzinger, G., C.R. Acad. Sci. Ser. C277 (18), 813–5(1973). Ethylenediamine, 1,2-propanediamine, and trimethylenediamine have been used to complex cotton cellulose, Creely et al., J. Polym. Sci. Pt. Al 9(8), 2409–11(1977). Cotton has also been swollen with butylamine, Bredereck et al., Melliand Textilber. Int. 54(3), 263–9(1973), morpholine and ethanolamine, Koura et al., Faserforsch. Textiltech 24(2), 82–6(1973), 24(5), 187–94(1973), pyridine, Philip et al., Faserforsch. Textiltech. 24(3), 106–12(1973). Amines have also been used to swell wood and impart dimensional stability, for example diethylamine, tributylamine and n-butylamine, Narayanamurti et al., Drev. Vysk. 17(4), 189–96(1972), pyridine and N-methylpyrrolidone, Ashton, H., Wood Sci. 6(2), 159–66(1973) and 6(4), 368–74(1973) and pyridine, Rosen et al., Wood Sci. 7(2), 149–152(1974). Sulfite pulp has been swollen with ethanolamine and ethylene diamine, Kaimins et al., Khim. Drev. 1974(1), 8–12. This and similar art suggest that amines in general will act on the cellulose fibers in wood, paper, cotton cloth, and regenerated cellulose to cause the fibers to swell and absorb the amine.

The prior art also described numerous types of inclusion complexes of other solvents such as hexamethylphosphoramide, toluene, alcohols, etc., within cellulose. LeGall et al., C.R. Acad. Sci. Ser. C 274(18), 1557–60(1972). The silanation of cellulose has been carried out by treating cellulose with solvents such as dimethylsulfoxide or pyridine and hexamethyldisilazane. The solvents and hexamethyldisilazane form unstable crystalline complexes which initiate the silanation reaction, Nagy et al., Makromol. Chem. 165, 335–8(1973).

Charge transfer complexes have been isolated and studied which include the 1:1 complexes of trimethylchlorosilane with pyridine, quiniline, acridine, and triethylamine. See Bogdanova et al., Zh. Osbhch. Khim. 46(3), 655–9(1976) and Diech et al., Latv. PSR Zinat. Akad. Vestis, Kim. Ser. 1976(3), 339–40.

SUMMARY OF THE INVENTION

A cellulosic material such as paper, cotton fibers, and wood is first impregnated with an organic base such as primary, secondary, and tertiary aliphatic, alicyclic, and aromatic amines and polyamines or heterocyclic bases such as pyridine, substituted pyridines, pyrrolidones, etc. The organic base penetrates and swells the cellulosic fibers. The amine or organic base impregnated cellulosic material is then treated with the vapors of or a solution of halosilanes. These halosilanes are of the structure:

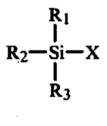

X is a halogen selected from the group fluorine, chlorine, bromine, and iodine. $R_1$ is an organic radical selected from the group aliphatic, alicyclic, vinyl, aromatic, and substituted aromatic, $R_2$ and $R_3$ are selected from the groups including halogens and the organic radicals of $R_1$.

The halosilane reacts with the organic base included in the swollen cellulose fibers to form a complex within the cellulose fiber and on the surface of the fiber and the complexed silane is retained permanently within and on the cellulosic material. The amount of treatment depends on the amount of organic base retained in the cellulose structure and the amount of silane used in the final treatment. The complex content has been varied from only a trace to more than a half the weight of the original cellulosic material.

There is no after-treatment required to remove halogen acid by-products as the silane is stabilized by complexing with the amine. The amine-silane complex treatment of cellulosic materials gives a variety of new and improved products. Paper and wood products are stabilized against dimensional changes related to changes in atmospheric humidity. Wood and fiberboard products can be made resistant to warping and can be made water-repellent. Cotton textiles can be made shrink-resistant and water-repellent. The complex treatment can make the cellulosic materials abhesive to function as release layers for pressure-sensitive adhesives and other tacky materials. Particular aminesilane complex treatments can be selected which will make the cellulosic materials oleophobic or oil repellent and stain resistant. Complexes of vinyl-containing silanes of the invention can act as polymerization sites for polymeric grafting onto the cellulosic material. Since the silane complexes do not in themselves produce a continuous polymeric film as normally found with silicone polymers, the treated materials retain their porosity and allow the passage of air and gases or, in other words, breathe.

The moisture content is not a critical factor for aminesilane complexing as in the halosilane treatment of paper and textiles described in the prior art. The property desired in the final product is obtained by selection of the proper aminesilane combination and by the amount of treatment applied. The properties of the treated cellulosic materials can be further varied by treatment with a combination of silanes instead of a simple silane.

DESCRIPTION OF PREFERRED EMBODIMENTS

Specific examples of the amine-silane systems useful in the practice of the invention are set forth in TABLE I.

The following general description of one preferred mode of treatment of paper products to form amine-silane complexes therewithin, in accordance with the invention, is for illustration only and is not to be construed in any limiting sense.

Ordinary paper—as an example, Nekoosa-Edwards Mirra Form Manifold Bond Paper was first treated with a solution of an amine in a solvent e.g. 0.5% cyclohexylamine in toluene. Other solvents which can be used include hydrocarbons, alcohols, ketones, esters, ethers, etc. The invention is not limited to these solvents as any solvent may be used which will form a homogeneous mixture with the amine. The preferred treatment is to saturate the sheet. Such saturation is conveniently achieved by the simple immersion of the paper in the amine solution. The so-treated sheet was then immersed in a solvent solution of a halosilane, e.g., 1% trichloromethyl silane, or vinlytrichlorosilane in toluene to give both water and oil repellency. The solvent used for the halosilane must not be reactive with the halosilane. Suitable "inert" solvents include xylenes, benzene, halogen and alkyl substituted aromatics, aliphatic hydrocarbons of C-6 or higher molecular weight, chlorinated aliphatic hydrocarbons, alicyclic hydrocarbons, substituted cyclohexanes, etc. If a solvent such as methanol which is reactive with the halosilane is used in the amine solution, the methanol must be removed before immersion of the treated material in the silane solution. Otherwise, the amine-treated sheet may be immediately immersed in the halosilane solution.

Other amines may be used including amines from each of the following classes: aliphatic primary, secondary, and tertiary amines, aromatic primary amines, alicyclic primary and secondary amines and pyridine bases. All have been found to form the amine/silane complex within and on the surface of the paper fibers. Mono-, di-, and trihalo organosilanes may be used wherein the organic groups are aliphatic, aromatic, and unsaturated maieties or mixtures of same. Amine concentrations as low as 0.5 percent and silane compositions as low as 1.0 percent were found useful in forming the amine/silane complexed paper. Concentrations were selected to give a desired amount of complex formation for end use application of the treated papers.

Numerous specific illustrative examples of the systems of the invention are given in TABLE I which illustrate the use of various amine and silane combinations used on a 25 lb/3000 sq. ft. Mirra Form bond paper. The percentages given in the "silane" column of Table I and in the "Amine" column represent concentrations in toluene, with the exception of example numbers 34 through 39 in which the amine used was triethanolamine (TEA). In these examples, the paper was passed through or immersed in a methanol solution of the amine and then allowed to dry to remove the alcohol solvent. The dry, amine-treated paper was then passed through or immersed in a toluene solution of the silane and then air-dried. In all examples except those involving TEA the amine was dissolved or dispersed in toluene and either air dried followed by immersion in the silane solution or the wet sheets immersed in the silane solution. The same formulations were used effectively in treating wood.

The amount of amine/silane complex formed at different concentrations is listed under the column "lb (3000 sq. ft.) basis weight." Without complex formation, this amount or weight would not be measurable by weighing methods normally used in the paper industry.

TABLE I also includes a column heading, "Release." This represents the comparative adhesion of pressure-sensitive adhesive tape which has been applied with firm pressure to the treated paper and then slowly removed at an angle of about 120°. The tape used was 3M Co.'s Magic Tape.® Untreated paper always gave complete paper tear. All treating formulations listed in the examples of TABLE I which give "clean peel" are suitable for use in the preparation of release papers. The overall effectiveness depends upon such factors as basis weight of coating, silane used and, to a lesser degree, the amine used. Representative examples include Nos. 5, 6, 8, 9, 16, 45, 47, 48, 50–54, 58–63, 78, 81, 89, 96, 98, 99, 121, 122, 136, 137, 143, 144, 148, 152, 153, 157, 158, 163, 173, 174, 183, 184, 187, 188. Compositions containing dodecyltrichlorosilane are the best.

The usefulness of the amine-silane complexed paper in business forms was demonstrated in the following manner. The amine/silane complex treated paper was coated with a microcapsule composition containing Santicizer 140®, a product sold by Monsanto comprising a mixed triarylphosphate and an oil-soluble black dye. This sheet with the black coating on the bottom formed the middle sheet of a 3-part form. The top and bottom sheets were untreated manifold bond paper. By marking the top sheet with a pen or typewriter, the capsules were broken on the second sheet and an image was formed by transfer of the ink form the capsule coating to the bottom sheet. An image was also created on the top surface of the amine/silane treated sheet by transfer of the ink from the broken capsules through a channel created in the sheet by the pressure marking. Normally, in an untreated sheet the ink would continue to spread through the paper fibers, in the manner shown by ordinary blotting paper, resulting in the spreading and obliteration of the image. However, proper treatment of the fibers with certain of the amine/silane complex systems results in the treated fibers becoming oleophobic or oil repelling and the spreading of the image is either eliminated or greatly reduced. This is shown in TABLE I under the heading "oil penetration." In this column, three +'s indicate no spreading of the image, two +'s mean only slight spreading, and one + indicates some spreading but noticeably improved over the untreated papers as they were evaluated several months after marking. Many of the other examples resisted spreading for periods ranging from a few hours to a few days. Other oils such as vegetable oils, petroleum oils, etc., substituted for the Santicizer 140® gave essentially the same results.

The examples of TABLE I exhibiting good oil resistance include the following: Nos. 1, 3-9, 14-18, 41-57, 59-63, 143, 148, 153, 157, 163, 167, 168, 173, 177, 178, 187, 188. Here the trihalo silane derivatives are generally the most acceptable.

The examples in TABLE I were also used to demonstrate the effect of the amine/silane complex treatment on the water repellency of cellulosic materials. In one test, droplets of water were applied to sheets of amine/silane treated paper. Beading of the droplets, spreading of the droplets, and penetration of the sheet were studied initially and also after standing for a period of one hour after the droplets were applied. Those examples which showed water repellency by beading and resistance to surface spreading and sheet penetration after one hour included Examples 1-9, 30, 45, 48, 49, 50, 52, 53, 54, 57-63, 75, 101, 125-127, 130, 133, 139, 143, 147, 153, 167, 173, 177, 178, and 183. Those with the least spreading and penetration were Examples 1-9, 30, 45, 48, 49, 52, 53, 54, 58-63, 130, 143, 147, 153, 173, 177, and 183. The remaining examples showed no improvement and many were more sensitive to water than the untreated control.

A similar test was conducted by partial immersion of birch tongue depressors in the amine systems of TABLE I, followed by the silane treatments of TABLE I. The same examples showed a hydrophobic character on the treated portions as demonstrated by lack of uniform wetting of the treated areas and warping at the line separating the treated from the untreated portions on drying.

Various types of cellulosic materials may be used in the practice of the invention. Such materials include kraft and bleached sulfite papers, cotton cloth and fibers, wood, rayon, etc. Each can be swollen by amine treatment so that the co-reactants readily form inclusions with the cellulose products. Reaction rates and strength of bond affect the amount of complex deposited and vary from silane to silane and amine to amine. The monochloro or monohalo silanes give a pattern of low weight compositions indicating weaker complexing capability than the polyhalosilanes. The choice of amine has an effect on the amount of complex formed and deposited. Examples 19-27 illustrate a very weak complexing system between chlorotrimethyl silane and piperidine. Similar results are found with triethylchlorosilane but the complex is a little stronger, Nos. 133-138. See again trimethylbromosilane, No. 142. Use of other amines with trimethylchlorosilane show increased complex strength: No. 156 with cyclohexylamine, No. 166 with morpholine, etc.

It was also interesting to note that the transparency of the sheets was increased with some treatments and the sheets became more opaque with other treatments. The complex papers which become more opaque include Examples Nos. 3, 4, 5, 6, 7, 8, 9, 14, 15, 16, 17, 18, 137, 138, 143. Examples which become less opaque include 42, 45, 46, 47, 48, 52, 56, 57, 61, 63, 75, 78, 81, 96, 97, 98, 99, 144, 148, 153, 158, 163, 168, 173, 174, 178, 183, 184, and 188.

It should be understood that the foregoing description is for the purpose of illustration and that the invention includes all modifications and equivalents within the scope of the appended claims.

TABLE I

COMPLEX AMINE SILANE TREATED PAPERS

| No. | | Amine | | Silane | Release | lb (3000 sq ft) Basis wt | Oil penetration |
|---|---|---|---|---|---|---|---|
| 1 | 2% | piperidine | 2% | trichloromethylsilane | Paper tear | 1.94 | +++ |
| 2 | 2% | " | 5% | " | Sl. paper tear | 3.28 | |
| 3 | 2% | " | 10% | " | few if any fiber pull | 3.67 | +++ |
| 4 | 5% | " | 2% | " | paper tear, less than 1 | 1.98 | ++ |
| 5 | 5% | " | 5% | " | clean peel | 5.78 | +++ |
| 6 | 5% | " | 10% | " | clean peel | 4.92 | +++ |
| 7 | 10% | " | 2% | " | Sl. paper tear | 2.64 | +++ |
| 8 | 10% | " | 5% | " | clean peel | 3.57 | +++ |
| 9 | 10% | " | 10% | " | clean peel | 4.07 | +++ |
| 10 | 2% | " | 2% | dichlorodiphenylsilane | some paper tear | 2.26 | |
| 11 | 2% | " | 5% | " | Sl. fiber pull | 3.34 | |
| 12 | 2% | " | 10% | " | Sl. fiber pull | 8.00 | |
| 13 | 5% | " | 2% | " | Sl. fiber pull | 2.93 | |
| 14 | 5% | " | 5% | " | peeled, powder | 8.86 | + |
| 15 | 5% | " | 10% | " | peeled, powder | 12.00 | ++ |
| 16 | 10% | " | 2% | " | clean peel | 4.74 | + |
| 17 | 10% | " | 5% | " | peeled, powder | 9.94 | + |
| 18 | 10% | " | 10% | " | peeled, powder | 16.34 | +++ |
| 19 | 2% | " | 2% | chlorotrimethylsilane | no improvement | not measurable | |
| 20 | 5% | " | 5% | " | " | " | |
| 21 | 10% | " | 10% | " | " | " | |
| 22 | 2% | " | 2% | " | " | " | |

TABLE I-continued

COMPLEX AMINE SILANE TREATED PAPERS

| | No. | Amine | | Silane | Release | lb (3000) sq ft) Basis wt | Oil pene- tration |
|---|---|---|---|---|---|---|---|
| 23 | 5% | " | 5% | " | " | " | |
| 24 | 10% | " | 10% | " | " | " | |
| 25 | 2% | " | 2% | " | " | " | |
| 26 | 5% | " | 5% | " | " | " | |
| 27 | 10% | " | 10% | " | " | " | |
| 28 | 2% | pyridine | 2% | " | Poor release | .62 | |
| 29 | 2% | " | 5% | " | " | 1.12 | |
| 30 | 2% | " | 10% | " | " | .63 | |
| 31 | 5% | " | 2% | " | " | — | |
| 32 | 5% | " | 5% | " | " | 54 | |
| 33 | 5% | " | 10% | " | " | .64 | |
| 34 | 2% | TEA | 2% | " | " | 1.96 | |
| 35 | 2% | " | 5% | " | " | 2.50 | |
| 36 | 2% | " | 10% | " | " | — | |
| 37 | 5% | " | 2% | " | " | 3.08 | |
| 38 | 5% | " | 5% | " | " | .8 | |
| 39 | 5% | " | 10% | " | " | 2.45 | |
| 40 | 2% | piperidine | 2% | trichlorophenylsilane | some paper tear | 1.62 | |
| 41 | 2% | " | 5% | " | " | 1.62 | + |
| 42 | 2% | " | 10% | " | v. sl. paper tear | 3.84 | +++ |
| 43 | 5% | " | 2% | " | some paper tear | 2.18 | + |
| 44 | 5% | " | 5% | " | " | 2.74 | + |
| 45 | 5% | " | 10% | " | clean peel | 3.92 | + |
| 46 | 10% | " | 2% | " | paper tear | 1.60 | ++ |
| 47 | 10% | " | 5% | " | clean peel | 2.82 | ++ |
| 48 | 10% | " | 10% | " | clean peel | 4.42 | ++ |
| 49 | 2% | " | 2% | vinyltrichlorosilane | good peel | 2.40 | ++ |
| 50 | 2% | " | 5% | " | sl. paper tear | 1.40 | ++ |
| 51 | 2% | " | 10% | " | clean peel | 2.66 | +++ |
| 52 | 5% | " | 2% | " | clean peel | 2.62 | ++ |
| 53 | 5% | " | 5% | " | clean peel | 2.28 | +++ |
| 54 | 5% | " | 10% | " | clean peel | 1.80 | +++ |
| 55 | 10% | " | 2% | " | paper tear | 2.43 | + |
| 56 | 10% | " | 5% | " | some fiber pull | 3.24 | +++ |
| 57 | 10% | " | 10% | " | " | 2.94 | ++ |
| 58 | 2% | " | 2% | dedocyltrichlorosilane | excellent peel | 1.00 | |
| 59 | 2% | " | 5% | " | " | 1.00 | ++ |
| 60 | 5% | " | 2% | " | " | 1.12 | + |
| 61 | 5% | " | 5% | " | " | 2.06 | + |
| 62 | 10% | " | 2% | " | " | 2.10 | +++ |
| 63 | 10% | " | 5% | " | " | 2.40 | ++ |
| 64 | 2% | " | 2% | dichlorophenylmethylsilane | no improvement | 1.60 | |
| 65 | 2% | " | 5% | " | " | 2.50 | |
| 66 | 2% | " | 10% | " | " | 2.80 | |
| 67 | 5% | " | 2% | " | " | 1.60 | |
| 68 | 5% | " | 5% | " | " | 2.16 | |
| 69 | 5% | " | 10% | " | " | 3.30 | |
| 70 | 10% | " | 2% | " | " | 1.80 | |
| 71 | 10% | " | 5% | " | " | 2.60 | |
| 72 | 10% | " | 10% | " | " | 2.50 | |
| 73 | 2% | " | 2% | chloropropyltrichloro- silane | paper tear | 1.74 | |
| 74 | 2% | " | 5% | " | some paper tear | 1.06 | |
| 75 | 2% | " | 10% | " | " | 2.60 | + |
| 76 | 5% | " | 2% | " | paper tear | .60 | |
| 77 | 5% | " | 5% | " | some paper tear | 1.60 | |
| 78 | 5% | " | 10% | " | clean peel | 2.64 | |
| 79 | 10% | " | 2% | " | some paper tear | 2.00 | |
| 80 | 10% | " | 5% | " | sl. paper tear | 2.30 | |
| 81 | 10% | " | 10% | " | clean peel | 4.44 | + |
| 82 | 2% | " | 2% | bromotrimethylsilane | some paper tear | 1.18 | |
| 83 | 2% | " | 5% | " | paper tear | 1.70 | |
| 84 | 2% | " | 10% | " | " | 1.68 | |
| 85 | 5% | " | 2% | " | some paper tear | .60 | |
| 86 | 5% | " | 5% | " | some paper tear | .84 | |
| 87 | 5% | " | 10% | " | " | 1.26 | |
| 88 | 10% | " | 2% | " | paper tear | .60 | |
| 89 | 10% | " | 5% | " | clean peel | 3.50 | + |
| 90 | 10% | " | 10% | " | sl. paper tear | 3.30 | |
| 91 | 2% | " | 2% | diphenyldifluorosilane | sl. paper tear | 1.10 | |
| 92 | 2% | " | 5% | " | v. sl. paper tear | 1.90 | |
| 93 | 2% | " | 10% | " | " | 1.40 | |
| 94 | 5% | " | 2% | " | some paper tear | 1.20 | |
| 95 | 5% | " | 5% | " | clean peel | 1.42 | |
| 96 | 5% | " | 10% | " | clean peel | 2.26 | |
| 97 | 10% | " | 2% | " | sl. paper tear | 1.92 | |
| 98 | 10% | " | 5% | " | clean peel | 1.80 | |
| 99 | 10% | " | 10% | " | " | 2.50 | |

TABLE I-continued

COMPLEX AMINE SILANE TREATED PAPERS

| | No. | Amine | | Silane | Release | lb (3000) sq ft) Basis wt | Oil penetration |
|---|---|---|---|---|---|---|---|
| 100 | 2% | " | 2% | methylvinyldichlorosilane | paper tear | .80 | |
| 101 | 2% | " | 5% | " | " | 1.44 | |
| 102 | 2% | " | 10% | " | " | 1.02 | |
| 103 | 5% | " | 2% | " | " | .76 | |
| 104 | 5% | " | 5% | " | " | .70 | |
| 105 | 5% | " | 10% | " | " | 1.10 | |
| 106 | 10% | " | 2% | " | some paper tear | 1.90 | |
| 107 | 10% | " | 5% | " | " | 2.00 | |
| 108 | 10% | " | 10% | " | sl. paper tear | 2.40 | |
| 109 | 2% | " | 2% | diphenylmethylbromosilane | some paper tear | 1.42 | |
| 110 | 2% | " | 5% | " | " | 1.52 | |
| 111 | 2% | " | 10% | " | " | 2.00 | |
| 112 | 5% | " | 2% | " | paper tear | 0 | |
| 113 | 5% | " | 5% | " | " | 1.24 | |
| 114 | 5% | " | 10% | " | " | 4.90 | |
| 115 | 10% | " | 2% | " | " | 2.90 | |
| 116 | 10% | " | 5% | " | " | 1.90 | |
| 117 | 10% | " | 10% | " | " | 3.40 | |
| 118 | 5% | cyclohexy-lamine | 2% | " | some paper tear | 1.16 | |
| 119 | 5% | " | 5% | " | some fiber pull | 4.00 | |
| 120 | 5% | " | 10% | " | fiber pull | 3.50 | |
| 121 | 5% | " | 2% | phenyldimethylchlorosilane | clean peel | 2.50 | |
| 122 | 5% | " | 5% | " | " | .60 | |
| 123 | 5% | " | 10% | " | sl. fiber pull | .94 | |
| 124 | 2% | piperdine | 2% | " | some paper tear | .30 | |
| 125 | 2% | " | 5% | " | paper tear | .16 | |
| 126 | 2% | " | 10% | " | " | .62 | |
| 127 | 5% | " | 2% | " | some paper tear | .22 | |
| 128 | 5% | " | 5% | " | paper tear | .80 | |
| 129 | 5% | " | 10% | " | " | 0 | |
| 130 | 10% | " | 2% | " | " | 1.62 | |
| 131 | 10% | " | 5% | " | " | .2 | |
| 132 | 10% | " | 10% | " | " | 1.12 | |
| 133 | 2% | " | 10% | triethylchlorosilane | " | .44 | |
| 134 | 5% | " | 10% | " | " | .75 | |
| 135 | 10% | " | 10% | " | " | 2.62 | |
| 136 | 2% | cyclohexy-lamine | 10% | " | clean peel | 1.06 | |
| 137 | 5% | " | 10% | " | " | 1.43 | |
| 138 | 10% | " | 10% | " | clean peel/some powder | 1.80 | |
| 139 | 5% | 1,1,1,3,3,3-hexafluoro-2,2-propane diamine in methanol & dried | 10% | methylvinyldichlorosilane | paper tear | 1.40 | |
| 140 | | | 10% | phenyldimethylchloro-silane | paper tear | 1.20 | |
| 141 | 5% | " | 10% | diphenyldifluorosilane | paper tear | 1.60 | |
| 142 | | " | 10% | trimethylbromosilane | " | .50 | |
| 143 | | " | 6.5% | dodecyltrichlorosilane | clean (easy) peel | 2.88 | + |
| 144 | | " | 10% | chloropropyltrichloro-silane | clean (hard) peel | 5.42 | |
| 145 | | " | 10% | phenylmethyldichlorosilane | paper tear | 4.40 | |
| 146 | | " | 10% | trimethylchlorosilane | " | 1.00 | |
| 147 | | " | 10% | vinyltrichlorosilane | some paper tear | 3.30 | |
| 148 | | " | 10% | phenyltrichlorosilane | clean (hard) peel | 3.50 | ++ |
| 149 | 5% | cyclohexyl-lamine | 10% | methylvinyldichlorosilane | fiber pull | 1.80 | |
| 150 | | " | 10% | phenyldimethylchlorosilane | " | 2.16 | |
| 151 | | " | 10% | diphenyldifluorosilane | " | 2.70 | |
| 152 | | " | 10% | trimethylbromosilane | clean (easy) peel | 1.22 | |
| 153 | | " | 6.5% | dodecyltrichlorosilane | " | 2.66 | + |
| 154 | | " | 10% | chloropropyltrichloro-silane | sl. fiber pull | 3.97 | |
| 155 | | " | 10% | phenylmethyldichlorosilane | paper tear | 3.50 | |
| 156 | | " | 10% | trimethylchlorosilane | some paper tear | 2.20 | |
| 157 | | " | 10% | vinyltrichlorosilane | clean (easy) peel | 3.36 | +++ |
| 158 | | " | 10% | phenyltrichlorosilane | " | 2.20 | |
| 159 | 5% | morpholine | 10% | methylvinyldichlorosilane | paper tear | 1.86 | |
| 160 | | " | 10% | phenyldimethylchlorosilane | " | 1.92 | |
| 161 | | " | 10% | diphenyldifluorosilane | some paper test | 3.60 | |
| 162 | | " | 10% | trimethylbromosilane | paper tear | 1.18 | |
| 163 | 5% | morpholine | 6.5% | dodecyltrichlorosilane | clean peel | 2.96 | + |
| 164 | | " | 10% | chloropropyltrichloro-silane | some fiber pull | 2.10 | |
| 165 | | " | 10% | phenylmethyldichlorosilane | paper tear | 2.30 | |
| 166 | | " | 10% | trimethylchlorosilane | fiber pull | 1.40 | |
| 167 | | " | 10% | vinyltrichlorosilane | sl. fiber pull | 1.68 | ++ |

TABLE I-continued

COMPLEX AMINE SILANE TREATED PAPERS

| | No. | Amine | | Silane | Release | lb (3000) sq ft) Basis wt | Oil penetration |
|---|---|---|---|---|---|---|---|
| 168 | | " | 10% | phenyltrichlorosilane | v. sl. fiber pull | 3.27 | ++ |
| 169 | 5% | pyridine | 10% | methylvinyldichlorosilane | paper tear | 1.60 | |
| 170 | | " | 10% | phenyldimethylchlorosilane | " | .62 | |
| 171 | | " | 10% | diphenyldifluorosilane | fiber pull | 1.70 | |
| 172 | | " | 10% | trimethylbromosilane | paper tear | .60 | |
| 173 | | " | 6.5% | dodecyltrichlorosilane | clean peel | 2.54 | + |
| 174 | | " | 10% | chloropropyltrichloro-silane | clean peel | 2.96 | |
| 175 | | " | 10% | phenylmethyldichlorosilane | strong fiber pull | 2.28 | |
| 176 | | " | 10% | trimethylchlorosilane | paper tear | 1.40 | |
| 177 | | " | 10% | vinyltrichlorosilane | v. sl. fiber pull | 2.16 | ++ |
| 178 | | " | 10% | phenyltrichlorosilane | " | 2.36 | + |
| 179 | 5% | t.octylamine | 10% | methylvinyldichlorosilane | strong fiber pull | .80 | |
| 180 | | " | 10% | phenyldimethylchlorosilane | " | 1.90 | |
| 181 | | " | 10% | diphenyldifluorosilane | sl. fiber pull | 2.10 | |
| 182 | | " | 10% | trimethylbromosilane | paper tear | 1.34 | |
| 183 | | " | 6.5% | dodecyltrichlorosilane | clean (easy) peel | 1.73 | |
| 184 | | " | 10% | chloropropyltrichloro-silane | clean peel | 2.30 | |
| 185 | | " | 10% | phenylmethyldichlorosilane | strong fiber pull | 1.18 | |
| 186 | | " | 10% | trimethylchlorosilane | sl. fiber pull | 1.24 | |
| 187 | | " | 10% | vinyltrichlorosilane | clean peel | 2.12 | ++ |
| 188 | | " | 10% | phenyltrichlorosilane | " | 2.50 | ++ |

What is claimed is:

1. The method of modifying the physical and chemical properties of cellulosic products such as paper, cotton cloth, wood and fiberboard to impart oil and water repellency to such products, to control the degree of transparency and opacity of such products, to render such products adhesive, and to enhance the dimensional stability thereof, said method comprising:

forming an amine/silane complex within the fibers of and as a coating for said cellulosic products, and including the steps of:

impregnating a cellulosic material with an organic base to distribute said base throughout said material, treating the base-containing cellulosic material with a halosilane to effect a chemical reaction between said organic base and said halosilane to form, in situ, within fibers of said cellulosic material and on the surface thereof a reaction complex of said organic base and said halosilane, said complex constituting in integral element of said cellulosic material permanently modifying the properties thereof.

2. The method as set forth in claim 1 wherein said organic base is selected from the group consisting of primary, secondary, and tertiary aliphatic, alicyclic, aromatic, and aralkyl amines and polyamines and heterocyclic bases such as pyridine, substituted pyridines, pyrrolidones, and mixtures thereof.

3. The method as set forth in claim 1 wherein said halosilane has the structure.

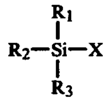

wherein

X is a halogen, $R_1$ is an organic radical selected from the group consisting of aliphatic, alicyclic, vinyl, aromatic, and substituted aromatic radicals and mixtures thereof, and $R_2$ and $R_3$ are selected from the group consisting of halogens, the organic radicals of $R_1$, and mixtures thereof.

4. The method as set forth in claim 1 wherein said organic base is selected from the group consisting of primary, secondary, and tertiary aliphatic, alicyclic, aromatic and aralkyl amines and polyamines and heterocyclic bases such as pyridine, substituted pyridines, pyrrolidones, and mixtures thereof, wherein said halosilane has the structure

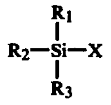

wherein is a halogen, $R_1$ is an organic radical selected from the group consisting of aliphatic, alicyclic, vinyl, aromatic, and substituting aromatic radicals and mixtures thereof, and $R_2$ and $R_3$ are selected from the group consisting of halogens, the organic radicals of $R_1$, and mixtures thereof.

5. The method as set forth in claim 1 wherein said cellulosic material is immersed in a solution of an organic base and then immersed in a solution of a halosilane.

6. The method as set forth in claim 5 wherein the concentration of organic base in solution is at least 0.5% by weight and the concentration of halosilane in solution is at least 1.0% by weight.

7. A cellulosic product containing as an integral, in-situ-formed element thereof distributed therethrough an amine/silane complex, said complex constituting a reaction product of an organic base and a halosilane.

8. The product as set forth in claim 7 wherein said organic base is selected from the group consisting of primary, secondary, and tertiary aliphatic, alicyclic, aromatic, and aralkyl amines and polyamines and heterocyclic bases such as pyridine, substituted pyridines, pyrrolidones, and mixtures thereof.

9. A cellulosic product as set forth in claim 7 wherein said halosilane has the structure

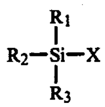

wherein

X is a halogen, $R_1$ is an organic radical selected from the group consisting of aliphatic, alicyclic, vinyl, aromatic, and substituted aromatic radicals and mixtures thereof, and $R_2$ and $R_3$ are selected from the group consisting of halogens, the organic radicals of $R_1$, and mixtures thereof.

10. The product as set forth in claim 7 wherein said organic base in selected from the group consisting of primary, secondary, and tertiary aliphatic, alicyclic, aromatic and aralkyl amines and polyamines, and heterocyclic bases such as pyridine, substituted pyridines, pyrrolidones, and mixtures thereof and wherein said halosilane has the structure

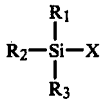

wherein

X is a halogen, $R_1$ is an organic radical selected from the group consisting of aliphatic, alicyclic, vinyl, aromatic, and substituted aromatic radicals and mixtures thereof, and $R_2$ and $R_3$ are selected from the group consisting of halogens, the organic radicals of $R_1$, and mixtures thereof.

* * * * *

UNITED STATES PATENT OFFICE
CERTIFICATE OF CORRECTION

Patent No. 4,151,327 Dated April 24, 1979

Inventor(s) William R. Lawton

It is certified that error appears in the above-identified patent and that said Letters Patent are hereby corrected as shown below:

Column 11, line 33, cancel the word "adhesive" and substitute therefor --abhesive--.

Column 11, line 48, cancel the word "in" and substitute therefor --an--

Column 12, line 45, before the word "is" insert the letter --X--

Column 13, line 21, cancel the word "in" and substitute therefor --is--

Signed and Sealed this

*Twenty-first* Day of *August 1979*

[SEAL]

*Attest:*

LUTRELLE F. PARKER

*Attesting Officer* *Acting Commissioner of Patents and Trademarks*